United States Patent
Zaffaroni

[11] 3,903,140
[45] Sept. 2, 1975

[54] DIAZADADECANE PROSTAGLANDIN COMPOUNDS

[75] Inventor: Alejandro Zaffaroni, Atherton, Calif.

[73] Assignee: Alza Corporation, Palo Alto, Calif.

[22] Filed: May 4, 1973

[21] Appl. No.: 357,194

Related U.S. Application Data

[62] Division of Ser. No. 70,520, Sept. 8, 1970, Pat. No. 3,764,620.

[52] U.S. Cl. ...... 260/501.2; 260/468 D; 260/514 D
[51] Int. Cl. ............................................. C07c 87/20
[58] Field of Search.......... 260/501.2, 404.5, 514 D, 260/468 D

[56] References Cited
UNITED STATES PATENTS
3,725,469   4/1973   Nelson........................ 260/514 D

OTHER PUBLICATIONS
Hoffman–LaRoche, Chemical Abstracts, Vol. 63, Col. 410c–d, (1965).

*Primary Examiner*—Howard T. Mars
*Assistant Examiner*—G. Breitenstein
*Attorney, Agent, or Firm*—Paul L. Sabatine; Steven D. Goldby

[57] ABSTRACT
Novel compounds of the formulae

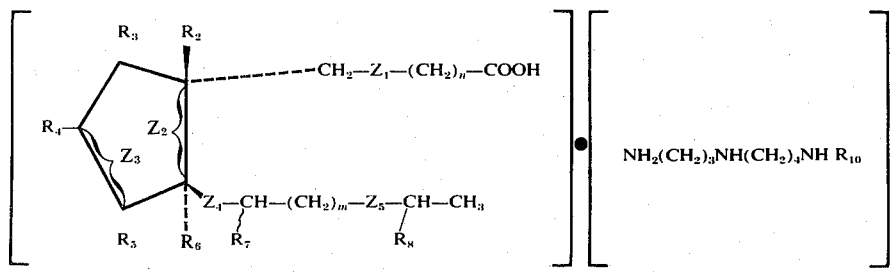

wherein $R_2$ and $R_6$ are hydrogen when $Z_2$ is a single bond and $R_2$ and $R_6$ are absent when $Z_2$ is a double bond; $R_3$ is keto,

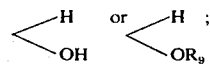

$R_4$ is hydrogen or

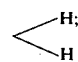

$R_5$ is hydrogen,

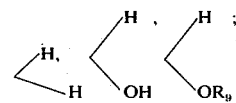

$R_7$ is hydroxyl or $OR_9$; $R_8$ is hydrogen or hydroxyl; $R_9$ is an acyl or alkoxyalkyl; $R_{10}$ is hydrogen or $(CH_2)_2NH_2$; $Z_1$ is $-CH_2CH_2-$ or cis $-CH=CH-$; $Z_2$ is a single or a double bond and it is a single bond when $R_2$ and $R_6$ are hydrogen and a double bond when $R_2$ and $R_6$ are absent; $Z_3$ is a single bond except when $R_4$ is hydrogen and $R_5$ is hydrogen; and when $R_4$ and $R_5$ are hydrogen, $Z_3$ is a double bond; $Z_4$ is $-CH_2CH_2-$ or trans $-CH=CH-$; $Z_5$ is $-CH_2Ch_2-$ or cis $-CH=CH-$; n is 2 to 5; m is 1 to 3; and x is 1 to 4. The compounds possess enhanced biological stability, and can serve as a reservoir for supplying prostaglandins that stimulate smooth muscles, act as vasoconstrictors, vasodepressors, inhibit gastric secretion, inhibit lipolysis and inhibit platelet aggregation.

9 Claims, No Drawings

DIAZADADECANE PROSTAGLANDIN COMPOUNDS

CROSS-REFERENCE TO RELATED APPLICATION

This application is a division of U.S. patent application Ser. No. 70,520 filed Sept. 8, 1970, now U.S. Pat. No. 3,764,620 issued on Oct. 9, 1970, and assigned to the same assignee as the earlier filed application.

BACKGROUND OF THE INVENTION

The present invention concerns new and useful compounds related to the prostaglandins. More particularly, the invention pertains to $\alpha,\omega$-diamino-azalkane derivatives of prostaglandins that possess improved biological stability and can also serve as a biological reservoir for the prostaglandin moiety in addition to possessing the valuable pharmacological properties of the parent prostaglandins that are made available from the azalkane prostaglandin derivatives following the release of the parent prostaglandin in situ. The new compounds of this invention have the structure as can be illustrated by ionic-type formula of Formula I or the compounds can also be illustrated by the conventional ionic-type formula as set forth in the accompanying claims. the azalkane prostaglandins of Formula I are as follows:

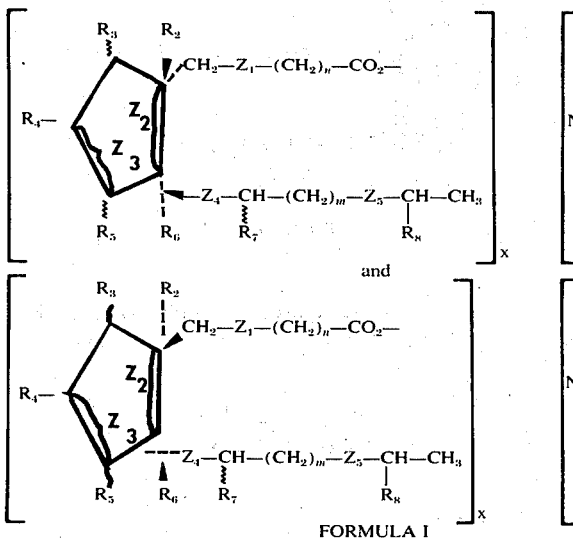
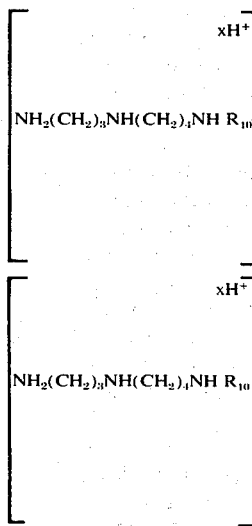

FORMULA I wherein $R_2$ and $R_6$ are hydrogen except when $Z_2$ is a double bond; and $Z_2$ is a double bond when $R_2$ and $R_6$ are absent; $R_3$ is a member selected from the group consisting of keto,

and

$R_4$ is selected from the group consisting of hydrogen and

$R_5$ is selected from the group consisting of hydrogen,

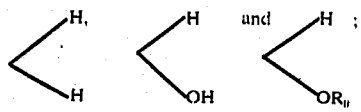

$R_7$ is selected from the group consisting of hydroxyl and $OR_9$; $R_8$ is selected from the group consisting of hydrogen and hydroxyl; $R_9$ is selected from the group consisting of acyl and alkoxyalkyl; $R_{10}$ is selected from the group consisting of hydrogen and $(CH_2)_3NH_2$; $Z_1$ is selected from the group of a saturated carbon carbon bond —$CH_2CH_2$— and cis unsaturated carbon carbon double bond —CH=CH—; $Z_2$ is selected from the group consisting of a single bond or a double bond; $Z_3$ is a single bond except when $R_4$ is hydrogen and $R_5$ is hydrogen; and, when $R_4$ and $R_5$ are hydrogen $Z_3$ is a double bond; $Z_4$ is selected from the group consisting of saturated carbon carbon bond —$CH_2CH_2$— and trans unsaturated carbon carbon bond —CH=CH—; $Z_5$ is selected from the group consisting of saturated carbon carbon bond —$CH_2CH_2$— and cis unsaturated —CH=CH—; and wherein $n$ is 2 to 5; $m$ is 1 to 3 and $x$ is 1 to 4. The wavy line in the formula indicates the stereochemistry of the substituents on the cycloalkyl ring or on the side chain may be oriented in an $\alpha$ or $\beta$ configuration. In the formulas, when the orientation is shown, $\alpha$ is a dotted line indicating the substituent is below the plane and $\beta$ is a heavy line indicating the substituent is above the plane. The asymmetric configuration on the alkyl side chain can also be indicated as sinister (S) and rectus (R) and in the present formula a dotted line corresponds to S and a solid line corresponds to R. The new compounds of this invention include both optical isomers shown in Formula I, mixtures of these substances constituting mixtures of diastereomers, and such mixtures as constitute racemates.

The novel and unobvious compounds of the invention as embraced by Formula I are related to the prostaglandins, a group of naturally occurring endogenous biologically important compounds possessing diverse valuable pharmacological properties and they are also related to azalkanes, historically known as spermidine and spermine, also like the prostaglandins naturally occurring endogenous compounds. The prostaglandins are extremely effective as stimulants of alimentary and reproductive smooth muscle, nasal vasoconstrictors, vasodepressor substances, and as inhibitors of gastric acid secretion, lypolysis and platelet aggregation. The azalkanes, spermine and spermidine, are known for their physiological role of serving as a growth factor for certain types of bacteria, for their property to stimulate select protein synthesis and for their polycationic nature that produces effects similar to those obtained with magnesium ions and calcium ions which effects are apparently necessary for some enxymatic action, and the like. However, even though these compounds, especially the prostaglandins, possess the above mentioned valuable utilities in vitro, their potential has not been realized in vivo since the prostaglandins lack biological stability, for they are rapidly metabolized to inactive products on systemic administration. Furthermore, the prostaglandins having ketonic carbonyl and hydroxyl groups are rather unstable towards acidic conditions and they decompose in acidic conditions which properties inherently prevent the oral utilization of these compounds. In addition, they exhibit a low penetration rate through the dermal and like layers of the skin for vascular absorption and subsequent circulation thereof.

It will be appreciated by those versed in the art that if new prostaglandin compounds possessing unobvious properties that essentially overcome the problems associated with the rapid metabolism and ability of prostaglandins to modify the functions of tissues were made available, the new prostaglandins would represent a valuable contribution and improvement in the art.

Accordingly, it is an immediate object of the present invention to make available novel and unobvious azalkane prostaglandin compounds that overcome the problems associated with the prior art.

Yet another object of the present invention is to provide new azalkane prostaglandin compounds that can more effectively penetrate cell membranes, to more effectively modify intracellular physiological performance.

Still yet another purpose of the invention is to provide derivatives of prostaglandins that act as both an intracellular and extracellular reservoir of the azalkane prostaglandins for eventual release of the prostaglandin moiety in vivo and thereby ensure increased biological availability for contacted cells, glands, and tissues for their immediate use.

Yet still another object of the invention is to selectively protect prostaglandins by producing a new prostaglandin derivative that exhibits improved stability against detrimental biological conditions.

Yet another object of the present invention is to produce novel azalkane prostaglandin compounds that have improved ability to pass through the dermal layers of the skin and to be subsequently absorbed into the vascular system.

These and other features, objects and advantages of the present invention will become more readily apparent from the following detailed description of the invention taken in conjunction with the accompanying claims.

SUMMARY OF THE INVENTION

The invention concerns novel azalkane prostaglandin compounds that possess enhanced biological stability, to improved cellular penetration for passage through biological membranes including the epidermis, dermis and subcutis to be absorbed by the vascular bed in the dermis and subcutis, to improved cellular penetration for moving from the vascular system into brain tissue and to act as an azalkane prostaglandin reservoir for present and subsequent use of the prostaglandins. the azalkane prostaglandins upon subsequent entry into the cell are hydrolyzed to produce prostaglandins that possess the pharmacological properties of the parent prostaglandin.

DESCRIPTION OF THE INVENTION

The novel compounds of Formula I herein are prepared by reacting a prostaglandin of Formula II:

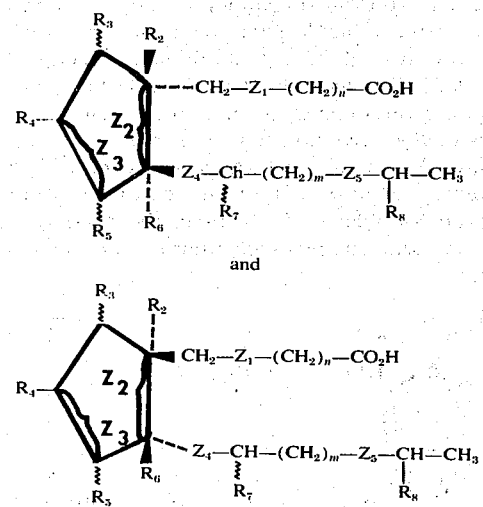

FORMULA II wherein $R_2$ and $R_6$ are hydrogen except when $Z_2$ is a double bond; $R_3$ is keto, $$\diagdown^H_{OH} \quad or \quad \diagdown^H_{OR_9} \; ;$$

$R_4$ is hydrogen or $$\diagdown^H_H ;$$

$R_5$ is hydrogen, $$H\diagdown^H_H \diagup_{OH} \quad or \quad \diagdown^H_{OR_9} \; ;$$

$R_7$ is hydroxy or $OR_9$; $R_8$ is hydrogen or hydroxy; $R_9$ is a α-alkoxyalkyl, and an acyl derived from a hydrocarboxylic acid; $Z_1$ is a saturated carbon carbon bond —$CH_2CH_2$— or a cis unsaturated carbon carbon bond —$CH=CH$—; $Z_2$ is a single or a double bond; $Z_3$ is a single bond except when $R_4$ is hydrogen and $R_5$ is hydrogen; $Z_4$ is a saturated carbon carbon bond —$CH_2CH_2$— or a trans unsaturated carbon carbon bond —CH=CH—; $Z_5$ is a saturated carbon carbon bond —$CH_2CH_2$— or cis unsaturated —CH=CH—; $n$ is 2 to 5; $m$ is 1 to 3. The wavy line in the formula indicates the sterochemistry of the substituents on the cycloalkyl ring or on the side chain (as projected) as: $\alpha$, a dotted linen (below the plane); or $\beta$, a heavy line (above the plane); and mixtures thereof including mixtures as diastereomers and racemates. The asymmetric configuration on the alkyl side chain can also be indicated as R(rectus) as S(sinister), with R and S the equivalent of $\beta$ and $\alpha$ respectively; with an azalkane of Formula III:

$$H_2N(CH_2)_3NH(CH_2)_4NHR_{10}$$

FORMULA III wherein $R_{10}$ is a member selected from the group consisting of hydrogen and $(CH_2)_3NH_2$. Generally, the reaction of the prostaglandin and the azalkane is carried out in the presence of a suitable inert solvent with mixing of stoichiometric amounts of the reactants, or with mixing of 1 to 4 moles of the prostaglandin with 1 mole of the azalkane at room temperature or in a warmed solvent and gradually mixing the reacting ingredients until all the ingredients are in solution. The novel product is obtained by chilling the resulting mixture to precipitate the crystals of the product or the product can be isolated by the addition of a miscible diluent of low polarity or by standard evaporation techniques. The obtained crystals or powders are filtered, washed and dried, usually in a desiccator, to a constant weight.

The starting materials used herein to synthesize the novel compounds of Formula I are prepared in known ways or they are readily obtained from commercial sources. The reacting materials of Formula II are easily prepared in art known ways either by isolating the prostaglandin from natural sources, for example, the vesicular glands of sheep, or by the enzymatic conversion from fatty acid substrates such as arachidonic acid, and depending on the substituents desired, routinely chemically transforming double bonds to single bonds by hydrogenation, converting keto groups to hydroxymethylene groups by reduction, by dehydrating to introduce double bonds, by forming carbinol derivatives by treating a carbo(lower) alkoxy group with an alkali metal alumino hydride reducing agent such as lithium aluminum hydride and the like. Specific prior art methods that set forth the procedures useful to provide all of the compounds of Formula II are found in *Science*, Vol 158, pages 382 to 391, 1967; *Recueil*, Vol 85, pages 1233 to 1250, 1966; *Biochem. Biophys. Acta.*, Vol 106, pages 215 to 217, 1965; *Agnew. Chem. Inter. Ed.*, Vol 4, pages 410 to 416, 1965, *Experientia*, Vol 21, pages 113 to 176, 1965; *Recueil*, Vol. 85, pages 1251 to 1253, 1966 and other art recorded procedures.

The prostaglandin compounds depicted by Formula II can also be chemically synthesized by well-known methods, for example, from 2-oxabicyclo-(3.3.0)-oct-6-en-3-one as described in *Tetrahedron Letters*, Vol 4, pages 311 to 313, 1970; by the hydrogenation of 11,15-bis(tetrahydropyranyl) ether over Pd/C followed by hydrolysis and treatment with Jones reagent to give the resulting prostaglandin as reported in *J. Am. Chem. Soc.*, Vol 92, pages 2586 to 2587, 1970; by the acid-catalyzed opening and rearrangement of epoxybicyclo-(3.1.0)-hexane as described in *J. Am. Chem. Soc.*, Vol 91, pages 5364 to 5371, 1969; by the reduction of 9-oxo and 15-oxo prostaglandin derivatives to give the R and S isomers of the corresponding hydroxyls and the dehydration of 11-hydroxy-9-oxoprostanoic acid to give the ketones as recorded in *J. Org. Chem.*, Vol. 34, pages 3552 to 3557, 1969; and *J. Lipid Research*, Vol 10, pages 320–325, 1969, as prepared by reduction of 2-oxa-3-oxo-6-exo-[trans-3-(S)-hydroxy-hept-1-enyl]-endo-7-acetoxy-cis-bicyclo[3.3.0]octane followed by reduction and treatment with Wittig reagent to give the corresponding prostaglandin as in *J. Am. Chem. Soc.*, Vol 91, pages 5675 to 5677, 1969; and other reported chemical synthesis embracing compounds within Formula II such as *J. Am. Chem. Soc.*, Vol 92, pages 937 to 938, 1970; *J. Am. Chem. Soc.*, Vol 91, pages 5675 to 5677, 1969; *Tetrahedron Letters*, Vol 5, pages 465 to 470, 1966; *The Proceedings of the Robert A. Welch Foundation Conference on Chemical Research*, Vol XII, pages 51 to 79, 1969 and in *Chem. Abst.*, Vol 66, page 75770; and in *Tetrahedron Letters*, Vol XV, pages 5185 to 5188, 1969.

Representative of the acyl moieties embraced within $R_9$ of Formula II are the alkanoyl groups containing 1 to 18 carbon atoms such as formyl, acetyl, propionyl, butyryl, isovaleryl, valeryl, hexanoyl, caproyl, octanoyl, heptanoyl, lauroyl, palmitoly, stearoyl, or nonanyl; and the radical oleoyl and the like. Exemplary of $\alpha$-alkoxy-alkyl groups included within $R_9$ is the group

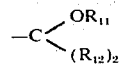

wherein $R_{11}$ is an alkyl group of 1 to 7 carbon atoms including the straight or branched chain alkyl groups such as methyl, ethyl, propyl, isopropyl, n-butyl, tert-butyl, pentyl, neopentyl, n-hexyl, isohexyl, and the like. The group $R_{12}$ is hydrogen, an alkyl of 1 to 7 as set forth.

Compounds that are suitable for the purpose of the invention that are represented by Formula II with their usual names based on art recognized prostanoic acid nomenclature are followed by the presently used abbreviations are the compounds 11$\alpha$,15(S)-dihydroxy-9-oxo-13-trans-prostenoic acid (PGE$_1$); 11$\beta$-15(R)-dihydroxy-9-oxo-13-trans-prostenoic acid, (11,15-epi-PGE$_1$); its antipode, ent-11,15-epi-PGE$_1$; 11$\alpha$,15(s)-dihydroxy-9-oxo-5-cis,15-trans-prostadienoic acid (PGE$_2$); 11$\alpha$,15(S)-dihydroxy-9-oxo-5-cis,13-trans,17-cis-prostatrienoic acid (PGE$_3$); 15(S)-hydroxy-9-oxo-10,13-trans-prostadienoic acid (PGA$_1$); 15(S)-hydroxy-9-oxo-5-cis,10,13-trans-prostatrienoic acid (PGA$_2$); 9$\alpha$,11$\alpha$,15(S)-trihydroxy-13-trans-prostenoic acid (PGF$_{1\alpha}$); 9$\beta$,11$\alpha$,15(S)-trihydroxy-13-trans-prostenoic acid (PGF$_{1\beta}$); 9$\beta$,11$\beta$,15(R)-trihydroxy-13-trans-prostenoic acid (11,15-epi-PGF$_{1\beta}$); its antipode, ent-11,15-epi-PGF$_{1\beta}$; 9$\alpha$11$\alpha$,15(S)-trihydroxy-5-cis,13-trans-prostadienoic acid, (PGF$_{2\alpha}$); 9$\beta$,11$\alpha$,15(S)-trihydroxy-5-cis,13-trans-prostadienoic acid, (PGF$_{2\beta}$); 9$\alpha$,11$\alpha$,15(S)-trihydroxy-5-cis,13-trans,17-cis-prostatrienoic acid (PGF$_{3\alpha}$); 9$\beta$,11$\alpha$,15(S)-trihydroxy-5-cis,13-trans-17-cis-prostatrienoic acid (PGF$_{3\beta}$); 15(S)-hydroxy-9-oxo-8(12),13-trans-prostadienoic acid (PGF$_1$); 15(S)-hydroxy-9-oxo-5-cis,8(12),13-trans-prostatrienoic acid (PGB$_2$); 15(S),19-dihydroxy-9-oxo-8(12),13-trans-prostadienoic acid (19-hydroxy PGB$_1$); 15(S),19-hydroxy-9-oxo-10,13-trans-prostadienoic acid (19- hydroxy PGA$_1$); 11α,15(S)-dihydroxy-9-oxo-prostanoic acid (dihydro PGE$_1$); 15(S)-hydroxy-9-oxo-8(12)-prostanoic acid (dihydro PGB$_1$); and the like.

The azalkanes starting materials of Formula III include 1,12-diamino-4,9-diazadodecane, also art known as spermine, can be easily prepared by the synthetic route involving the reduction of succinonitrile to 1,4-diaminobutane followed by cyanoethylation of the 1,4-diaminobutane with acrylonitrile to form N,N$^1$-bis (-2-cyanoethyl-diaminobutane) and reduction of the latter to give 1,12-diamino-4,9-diazododecane according to the procedure as set forth in *J. Am. Chem. Soc.*, Vol 70, pages 2666 to 2667, 1948. The azalkane 1,8-diamino-4-azaoctane, also known as sperimidine, can be made available by the steps of treatment of γ-aminobutyronitrile with acrylonitrile to give N-(2-cyanoethyl)-γ-aminobutyronitrile and reduction of the latter to give 1,8-diamino-4-azaoctane, as reported in *J. Am. Chem. Soc.*, Vol 74, pages 1836 to 1837, 1952. The azalkanes can also be prepared according to procedures set forth in *J. Org. Chem.*, Vol 21, pages 1374 to 1375, 1956; *Acta Chim. Acad. Sci. Hung.*, Vol 4, pages 5 to 9, 1954; *J. Org. Chem.*, Vol 25, pages 1055 to 1056, 1960; and *Chem. Abst.*, Vol 45, page 7008(g), 1952.

The solvents suitable for the purposes of the present invention include the more polar type of solvents such as tetrahydrofuran, chloroform, acetone, methylene chloride, ethylene chloride, dioxane, isobutyl ketone, methyl isobutyl ketone, dimethyl ether, diethyl ether, alkanols such as methanol, methyl butynol, n-amyl alcohol, 2-ethyl hexyl alcohol, ethylene glycol, ethanol, isopropanol, hexanol, butanol, pentanol and lesser polar solvents such as benzene, carbon tetrachloride, cycloalkanes such as cyclopentane, 1,2-dimethylcyclopentane, cyclooctane, isopropylcyclohexane, cyclohexane, and methylcyclohexane; alkanes such as 3-methylpentane, n-heptane, n-hexane, and the like.

The following examples are given simply to illustrate this invention, but they are not in any way to be construed as limiting the scope of the invention as these and other means for performing the invention will be obvious to those versed in the art in the light of this disclosure.

EXAMPLE 1

Preparation of 1,8-diamino-4-azaoctane 11α,15(S)-dihydroxy-9-oxo-13-trans-prostenoate:

To a warm solution of 0.355 grams of 11α,15(S)-dihydroxy-9-oxo-13-trans-prostenoic acid in 150 ml of dry ethylacetate is added a solution of 0.145 gram of 1,8-diamino-4-azaoctane in 150 ml of dry benzene. Then, 0.250 liter of petroleum ether are added and the resulting mixture is chilled. The solids are filtered, washed with petroleum ether and suspended in warm dry benzene. Petroleum ether is added until turbidity develops and the mixture is chilled overnight. The crystals are filtered, washed with petroleum ether and dried in a desiccator over concentrated sulfuric acid to a constant weight.

EXAMPLE 2

Preparation of 1,8-diamino-4-azaoctane 11α,15(S)-dihydroxy-9-oxo-5-cis, 13-trans-prostadienoate.

To a room temperature 30 ml solution of ethanol containing 0.352 gram, 0.001 mole of 11α,15(S)-dihydroxy-9-oxo-5-cis,13-trans-prostadienoic acid is added 30 ml of ethanol solution containing 0.145 gram, 0.001 mole of 1,8-diamino-4-azaoctane with constant stirring at room temperature. Next, the solution is evaporated under vacuum and the resulting product is triturated with benzene and the product is filtered, washed with ether-benzene mixtures and finally dried in a desiccator over Drierite to a constant weight.

EXAMPLE 3

Preparation of 1,12-diamino-4,9-diazadodecane 9β,11α,15(S)-trihydroxy-13-trans-prostenoate.

The procedure of Example 2 is employed in this example by reacting stoichiometrically equivalent amounts of 9α,11α,15(S)-trihydroxy-13-trans-prostenoic with 1,12-diamino-4,9-diazadodecane in dry ether with stirring at room temperature. After, the solution is evaporated under light vacuum, the product is triturated with cyclohexane, and the product filtered, washed with benzene and finally dried in a desiccator over concentrated sulfuric acid to a constant weight.

EXAMPLE 4

The synthesis of 1,8-diamino-4-azaoctane tri-(15(S)-hydroxy-9-oxo-10,13-trans-prostadienoate) is carried out by first adding to a room temperature 50 ml tetrahydrofuran solution containing 0.1008 gram, 0.003 mole of 15(S)-hydroxy-9-oxo-10,13-trans-prostadienoic acid a 50 ml tetrahydrofuran solution containing 0.0145 gram, 0.001 mole of 1,8-diamino-4-azaoctane with constant stirring until the mixing of the two solutions is complete. Next, the mixed solution is warmed to about 50°C to 55°C for ½ to 1½ hours to assure essentially complete formation of the desired product. Then, the solution is cooled to room temperature and the solvent evaporated with the resulting product triturated with benzene. Finally, the product is filtered, washed with a little benzene and dried in a vacuum desiccator to constant weight.

EXAMPLE 5

The compound 1,12-diamino-4,9-diazadodecane tetra-(9α,11α,15(S)-trihydroxy-13-trans-prostenoate) is prepared by intimately mixing 0.1418 gram, 0.0004 mole of 9α,11α-15(S)-trihydroxy-13-trans-prostenoic acid in 50 ml of dioxane with 0.0202 gram, 0.0001 mole of 1,12-diamino-4,9-diazadodecane in 50 ml of dioxane at room temperature. Next, the solution is heated to about 45°C to 50°C to assure formation of the ionic compound. Next, the solvent is evaporated and the procedure set forth in Example 4 is followed to obtain the final product.

Other novel compounds that are readily prepared according to the manner of the examples are for example, 1,8-diamino-4-azaoctane 11α,15(S)-dihydroxy-9-oxo-5-cis,13-trans,17-cis-prostatrienoate; 1,8-diamino-4-azaoctane 15(S)-hydroxy-9-oxo-5-cis,10,13-trans-prostatrienoate; 1,8-diamino-4-azaoctane 9α,11α,15(-S)-trihydroxy-5-cis,13-trans-prostadienoate; 1,8-diamino-4-azaoctane 9β,11α,15(S)-trihydroxy-5-cis,13-trans-prostadienoate; 1,12-diamino-4,9-diazadodecane 9α,11α,15(S)-trihydroxy-5-cis,13-trans,17-cis-prostatrienoate; 1,12-diamino-4,9-diazadodecane 9β,11α,15(S)-trihydroxy-5-cis,13-trans-17-cis-prostatrienoate; 1,8-diamino-4-azaoctane tri-(15(S)-hydroxy-9-oxo-8(12),13-transprostadienoate); 1,8-diamino-4-azaoctane tri-(15(S)-hydroxy-9-oxo-5-cis,8(12),13-trans-prostatrienoate; 1,8-diamino-4-azaoctane tri(15(S),1-9-hydroxy-9-oxo-10,13-trans-prostadienoate); 1,12- diamino-4,9-diazadodecane tetra-(11α,15(S)-dihydroxy-9-oxo-prostanoate); 1,12-diamino-4,9-diazadodecane tetra-(15(S)-hydroxy-9-oxo-8(12)-prostanoate); and the like.

The present invention makes available to the art novel azalkane prostaglandins that are presently believed to possess unobvious and improved properties not suggested by the art. Although it is not intended to be limited by any theory, it is believed that the novel compounds because of the presence of the ionic bond in the carboxyl moiety lends itself to both enhanced stability towards biological conditions by seemingly resisting the formation of metabolic inactive forms of the compounds and also to enhancing the membrane penetration property of the compound. The azalkane prostaglandins also possess the ability to act as a reservoir in vivo and thereby to serve as a source of the parent prostaglandin when the azalkane prostaglandins are circulated by the vascular system to glands, tissues, cells and the like, where in contact with cellular membranes they enter the cell for subsequent hydrolysis of the compound to make available at the needed biological site prostaglandin.

The novel compounds of the invention can be used in the form of suitable pharmaceutical preparations or veterinary preparations which contain the compounds in admixture with a non-toxic pharmaceutical organic carrier or a non-toxic pharmaceutical inorganic carrier to make preparations suitable for enteral, topical, parenteral administration and the like. The new compounds are administrable in the form of tablets, pills, powders, capsules, injectables, solutions, emulsions, suspensions, dispersions and in other suitable forms. Typical of pharmaceutically acceptable carriers, are for example, water, gelatine, lactose, starches, magnesium stearate, talc, vegetable oil, polyalkylene glycols, petroleum jelly and other conventionally used pharmaceutically acceptable carriers. The pharmaceutical preparation may also contain pharmaceutically acceptable auxiliary substances such as emulsifying, preserving, wetting agents and the like, as for example, sorbitan monolaurate, triethanolamine oleate, polyoxyethylene sorbitan monopalmitate, dioctyl sodium sulfosuccinate, and the like. The daily dose administered for the compound will of course vary with the particular novel compound employed because of the relative potency of the compounds, the route of administration and the size of the recipient. The dosage administered is not subject to definite bounds, but it will usually be an effective amount of the pharmacologically active free acid form produced upon the metabolic release of the prostaglandin to achieve the biological function of the prostaglandin. Exemplary of a typical method for administering the azalkane prostaglandin compounds is by an injectable-type administration route. By this route, a sterile physiological saline solution containing the azalkane prostaglandin 1,8-diamino-4-azaoctane-9α,11α,15(S)-trihydroxy 13-trans prostenoate compound is administered intravenously for contracting uterine muscles at the rate of 0.01 microgram to 0.15 microgram per minute per kilogram of body weight by means of an infusion pump, at the rate of 10 to 15 milliliter per hour as delivered in about 1 to 12 hours. For oral administration, compressed tablets containing 0.1 milligram to 5 milligrams calculated as the free acid of the prostaglandin are manufactured by art known techniques as set forth in *Remington's Pharmaceutical Science*, Chapter 39, Mack Publishing Co., 1965. Suitable topical preparations can easily be prepared by, for example, mixing 500 mg of the azalkane prostaglandin with 15 g of cetyl alcohol, 1 g of sodium lauryl sulfate, 40 g of cetyl alcohol, 43 g of sterile water, 0.25 g of methylparaben and 0.15 gr of propylparaben and warming the mixture with constant stirring to about 75°C and then permitting the preparation to congeal. The preparation can be readily applied to the skin by inunction and the like. Suitable procedures for preparing topical applications are set forth in Remington's Chapter 37 and other standard reference works.

The manufacture of capsules for oral use consists essentially of mixing the active compound with a non-toxic carrier and enclosing the mixture in a gelatin sheath. The capsule can be made in the soft form of a capsule as made by enclosing the compound in an intimate dispersion within an edible oil or the capsule can be a hard capsule consisting of the novel azalkane mixed with a non-toxic solid such as talc, calcium stearate, calcium carbonate or the like.

The azalkane prostaglandins can also be used in aerosol dosage form. An aerosol form can be descibed as a self-contained sprayable product in which the propellant force is supplied by a non-toxic liquified gas. For administering a self-propelled dosage form of about 100 mg to 400 mg that is used about three or four times daily for inhalation therapy, the bronchodialator 1,8-diamino-4-azaoctane 11α,15(S)-dihydroxy-9-oxo-5-cis,13-transprostadienoate is suspended in an inert non-toxic propellant in a commercially available compressed-gas aerosol container. Suitable propellants include trichloromonofluoromethane, dichlorodifluoromethane, dichlorodifluoroethane, monochlorodifluoroethane, dichlorodifluoroethane, monochlordifluoroethane, and mixtures thereof. The inert gas can also be mixed with non-toxic cosolvents such as lower alkanol-like ethanol if desired to produce the aerosol form.

The above examples and disclosure are set forth merely for illustrating the mode and manner of the invention and various modifications and embodiments can be made by those skilled in the art in the light of the invention without departing from the spirit of the invention.

I claim:

1. A compound selected from the compounds of the formulae:

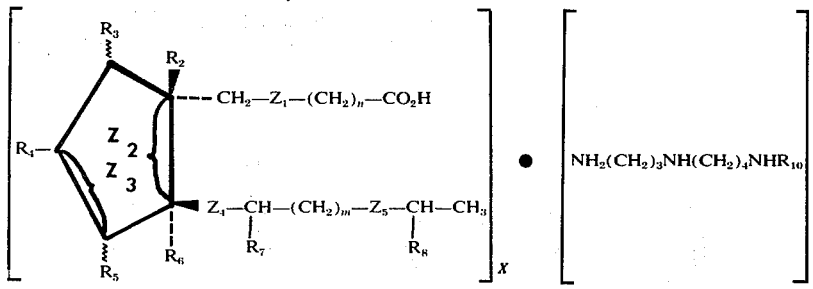

wherein $R_2$ and $R_6$ are hydrogen except when $Z_2$ is a double bond; $R_3$ is keto,

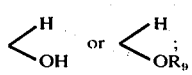

$R_4$ is hydrogen, or

$R_5$ is H,

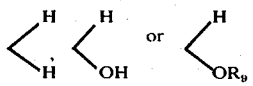

$R_7$ is hydroxyl or $OR_9$; $R_8$ is hydrogen or hydroxy; $R_9$ is of 1 to 18 carbon atoms alkyl or 1 to 8 carbon atoms, $R_{10}$ is $(CH_2)_3NH_2$; $Z_1$ is $-CH_2CH_2-$ or cis $-CH=CH-$; $Z_2$ is a single or a double bond; $Z_3$ is a sir bond except when $R_4$ is hydrogen and $R_5$ is hydrogen; $Z_4$ is $-CH_2CH_2-$ or trans $-CH=CH-$; $Z_5$ is $-CH_2CH_2$ or cis $-CH=CH-$; $n$ is 2 to 5, $m$ is 1 to 3 and $x$ is 1 to 4.

2. A compound according to claim 1, wherein the compound is 1,12-diamino-4,9-diazadodecane 11α,15-(S)-dihydroxy-9-oxo-13-trans-prostenoate.

3. A compound according to claim 1 wherein the compound is 1,12-diamino-4,9-diazadodecane 11α,15-(S)-dihydroxy-9-oxo-5-cis,13-trans-prostadienoate.

4. A compound according to claim 1 wherein the compound is 1,12-diamino-4,9-diazadodecane 11α15(S)- dihydroxy-9-oxo-5-cis,13-trans,17-cis-prostatrienoate.

5. A compound according to claim 1 wherein the compound is 1,12-diamino-4,9-diazadodecane 15(S)-hydroxy-9-oxo-10,13-trans-prostadienoate.

6. A compound according to claim 1 wherein the compound is 1,12-diamino-4,9-diazadodecane 15(S)-hydroxy-9-oxo-5-cis,10,13-trans-prostatrienoate.

7. A compound according to claim 1 wherein the compound is 1,12-diamino-4,9-diazadodecane 9α,11-α15(S)-trihydroxy-5-cis,13-trans-prostadienoate.

8. A compound according to claim 1 wherein the compound is 1,12-diamino-4,9-diazadodecane 9α,11-α,15(S)-trihydroxy-5-cis,13-trans,17-cis-prostatrienoate.

9. A compound according to claim 1, wherein the compound is 1,12-diamino-4,9-diazadodecane 9α,11-α,15(S)-trihydroxy-13-trans-prostenoate.

* * * * *